United States Patent [19]
Gumbert

[11] Patent Number: 5,993,718
[45] Date of Patent: Nov. 30, 1999

[54] MOLDED PLASTIC MOUNTING PART

[75] Inventor: Hans Gumbert, Sinn, Germany

[73] Assignee: U.S. Philips Corporation, New York, N.Y.

[21] Appl. No.: 08/909,921

[22] Filed: Aug. 12, 1997

[30] Foreign Application Priority Data

Aug. 30, 1996 [DE] Germany .............. 196 35 049

[51] Int. Cl.[6] .............. B29C 45/14; G11B 5/008
[52] U.S. Cl. .............. 264/242; 360/93
[58] Field of Search .............. 360/84, 85, 93, 360/96.5; 369/75.1; 264/242, 264; 403/114, 71

[56] References Cited

U.S. PATENT DOCUMENTS

| | | | |
|---|---|---|---|
| 4,554,123 | 11/1985 | Smyth | 264/166 |
| 5,284,397 | 2/1994 | Hayashi | 403/114 |
| 5,621,584 | 4/1997 | Lee | 360/85 |
| 5,716,575 | 2/1998 | Kammler et al. | 264/242 |

*Primary Examiner*—George J. Letscher

[57] ABSTRACT

A molded plastic mounting part (15, 16, 23) is formed as a base for function parts in a metal supporting plate (1, 20). The mounting part, in order to be mounted on the support plate, has a bridge element (5, 17) traversing a hole (2, 21) in the metal supporting plate and has retaining elements (7a, 7b) which bear against both plate surfaces (6a, 6b) of the metal supporting plate. To guarantee that the predetermined position of the mounting part with respect to the axis of the hole is maintained in spite of the shrinkage of the plastic material, the plate surfaces of the metal supporting plate (1, 20) have recesses (4a, 4b;) adjacent the hole, which recesses are engaged by projections (11a; 24a to 24d, 25a to 25d) of the retaining elements of the mounting part.

4 Claims, 3 Drawing Sheets

MOLDED PLASTIC MOUNTING PART

BACKGROUND OF THE INVENTION

1. Field of the Invention

This invention relates to a molded plastic mounting part formed as a base for function parts on a metal supporting plate, which mounting part, in order to be mounted on this plate, has a bridge element traversing a hole in the metal supporting plate, and retaining elements which bear against both plate surfaces of the metal supporting plate.

2. Description of Related Art

Mounting parts molded onto metal supporting plates are known, for example, from "Feinwerktechnik und Meβtechnik", Volume 87, No. 6, September 1979, pp. 253 to 259. The technique of manufacturing such mounting parts in combination with metal supporting plates is known by the name of outsert-molding technique. The mounting parts molded onto the metal supporting plate are intended for a variety of purposes, such as retaining, supporting or guiding the function parts. The function parts can be, for example, bearings, gear wheels, sliders, levers or spindles. The molded-on mounting parts and the supporting plate are always joined in that plastic retaining elements overlap edge portions of holes in the plates at the upper side and the underside of the plate and in that the plastic retaining elements are interconnected by a plastic bridge element traversing the hole. The plastic bridge element can be solid but it can also be internally hollow, taking the form of a sleeve.

Moreover, it is known that the cooling process, which begins after the plastic has been molded on, is accompanied by shrinkage of the plastic. This shrinkage takes place in all directions, i.e. in the longitudinal direction of the bridge element and in a direction perpendicular thereto. The shrinkage in the longitudinal direction of the bridge element results in a tighter fit of the retaining elements on the plate surfaces. The shrinkage in a direction transverse to the longitudinal direction results in an undesirable clearance between the wall of the hole in the metal mounting plate and the outer wall of the bridge element traversing the hole. As a result of this clearance, the accurate fit of a mounting part with respect to the hole is no longer exactly predetermined. The axis of the mounting part and the axis of the hole no longer coincide in a reliable manner and may become displaced with respect to one another.

SUMMARY OF THE INVENTION

It is an object of the invention to construct the mounting part so as to assure the predetermined position of the mounting part with respect to the hole axis in spite of the shrinkage of the plastic.

According to the invention this object is achieved in that the plate surfaces of the metal supporting plate have recesses adjacent the hole, which recesses are engaged by projections of the retaining elements of the mounting part.

Owing to the shrinkage of the plastic the projections of the retaining elements act with an axial pressure component onto the bottoms of the recesses, which are oriented towards the plate center, and with a radial pressure component towards the axis of the hole. The axial pressure component ensures that the retaining elements are firmly pressed against the metal supporting plate and the inwardly directed radial pressure component ensures that the mounting part is centered with respect to the axis of the hole. This guarantees an accurate position of the mounting part with respect to the axis of the hole.

In a further embodiment of the invention the bottoms of the recesses are inclined with respect to the plate center in such a manner that the depth of the recesses increases as the distance from the axis of the hole increases.

This precludes a separation of the free ends of the retaining elements from the metal supporting plate.

In a further embodiment of the invention both plate surfaces of the metal supporting plate have at least three recesses adjacent the hole, which recesses are disposed on the circumference of a circle around the hole, spaced at angles of 360°/x from one another, x being the number of recesses in each plate surface, and the mounting part is centered with respect to the axis by the arrangement of the recesses.

The arrangement of the recesses on the circumference of a circle around the hole axis ensures a uniform distribution of the radial shrinkage forces in a direction towards the axis of the hole. As a result of this, the mounting part is centered by means of the shrinkage forces. The discrete provision of a plurality of separate recesses ensures that the mounting part is locked against rotation.

The self-centering arrangement of the mounting parts in accordance with the invention on the supporting plate is achieved in that the mounting parts are drawn into the recesses of the plate surfaces owing to the shrinkage of the plastic, in such a manner that the projections of the mounting parts exert radially inward forces on the recesses, which forces center the mounting part relative to the axis of the hole.

The number of recesses depends on the shape of the hole. Preferably, 4 recesses should be provided in the case of a square hole and 3 recesses in the case of a triangular hole, one in each of the corners, in order to ensure accurate centering of the mounting part and thereby preclude mechanical deformation.

In a further advantageous embodiment of the invention the two plate surfaces of the metal supporting plate have annular recesses, the central axes of the annular recesses being essentially identical to the axis of the hole, and the mounting part is centered with respect to the axis by the arrangement of the recesses.

An annular recess is particularly favorable for reasons of production-engineering and is to be preferred in the case where no absolute locking against rotation of the mounting part is necessary. In the case of an annular recess the hole should preferably have a circular cross-section in order to obtain an exact centering of the mounting part with respect to the axis of the hole and thereby preclude mechanical deformation.

Such an arrangement is particularly suitable for mounting spindles or bearings. For this purpose, the bridge element should take the form of a sleeve, inside which the bearing or the spindle is secured.

The mounting part in accordance with the invention is preferably mounted in a deck or in a magnetic-tape-cassette apparatus.

A method of manufacturing the mounting part is characterized in that the hole associated with the recesses in the metal supporting plate is filled by means of a filling die during the formation of the recesses in the metal supporting plate.

The filling die prevents the hole from being deformed during punching of the recesses associated with the hole.

BRIEF DESCRIPTION OF THE DRAWINGS

The invention will be described in more detail hereinafter with reference to the drawings. In the drawings.

DETAILED DESCRIPTION OF THE PREFERRED EMBODIMENTS

Figure 1:
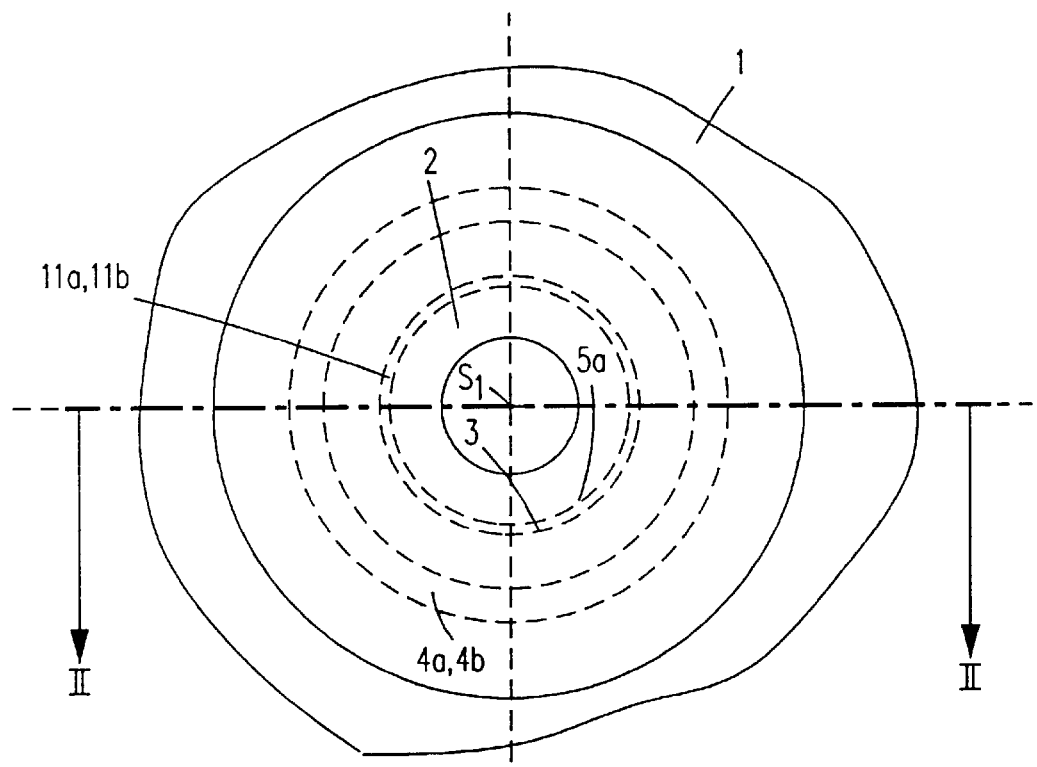
FIG. 1 is a plan view showing a tape deck with a part of a metal supporting plate having a hole of circular cross-section, with two annular recesses associated with the hole and formed in the surface of the metal supporting plate, and with a molded-on plastic mounting part whose bridge element takes the form of a sleeve, FIG. 2 a sectional view taken on the line II—II in FIG. 1.

FIG. 1 is a plan view of a tape deck TD which supports a metal supporting plate 1 having a hole 2 of circular cross-section and with a hole wall 3. The hole 2 has a central axis $S_1$.

Figure 2:
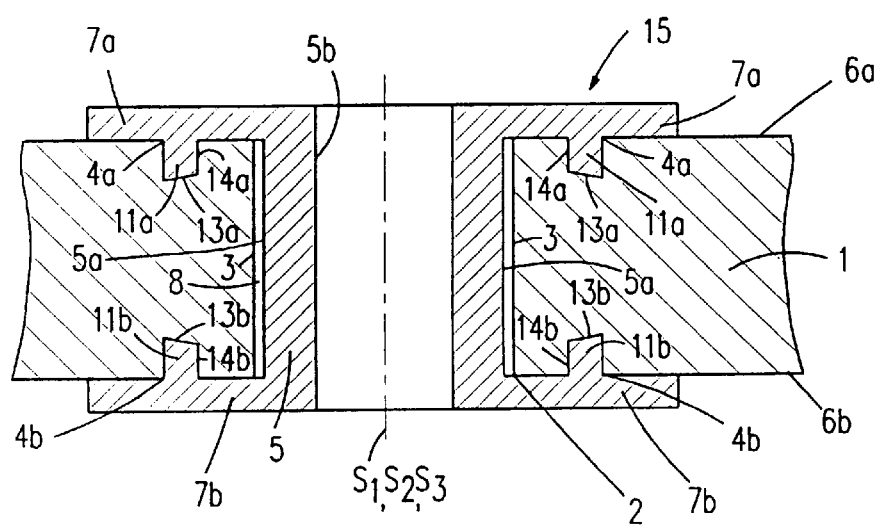

FIG. 2 shows the arrangement of FIG. 1 in a sectional view taken on the line II—II in FIG. 1. The metal supporting plate 1 has a first plate surface 6a and a second plate surface 6b. The plate surface 6a of the metal supporting plate 1 has been provided with a first annular recess 4a and the plate surface 6b of the metal supporting plate 1 has been provided with a second annular recess 4b. The first annular recess 4a and the second annular recess 4b have central axes $S_1$ and $S_3$ identical to the central axis $S_1$ of the hole 2. In the hole 2 a mounting part 15 has been formed by means of an outsert-molding technique. A bridge element 5 of the mounting part 15 in the form of a hollow cylinder traverses the hole 2 in the metal supporting plate 1 and is supported on both plate surfaces 6a and 6b radially around the hole 2 by means of retaining elements 7a and 7b. The bridge element 5 in the form of a hollow cylinder has an outer wall 5a and an inner wall 5b. A wide variety of function parts, not shown, for example bearings, spindles, pins etc. can be mounted in the hollow cylindrical bridge element 5. These parts can, for example, be clamped, snapped or cemented into the bridge element 5. It is also conceivable to secure the function part to the mounting part by means of welding.

After the plastic has been molded onto the metal supporting plate 1 shrinkage begins during the cooling process. This shrinkage takes place both in the direction of the central axis $S_1$ of the hole 2 and in a direction transverse thereto. The shrinkage in the direction of the central axis $S_1$ results in a tighter fit of the retaining elements 7a and 7b on the plate surfaces 6a, 6b of the metal supporting plate 1. The shrinkage transverse to the central axis $S_1$ results in the diameter of the outer wall 5a of the bridge element 5 being reduced and, consequently, said outer wall to become detached from the wall 3 of the hole. As a result of this, a shrinkage gap 8 is formed. Owing to this shrinkage gap 8 the mounting part 15 would in principle lose its positional accuracy with respect to the metal supporting plate 1. Then, the central axis $S_1$ of the hole 2 would no longer coincide with the central axis of the mounting part 15. Without any further measures being taken, lateral external pressure could lead to misalignment.

In order to preclude this, the annular recesses 4a and 4b have been provided in the metal supporting plate 1, in which recesses the projections 11a and 11b of the retaining elements 7a and 7b of the mounting part 15 engage. These projections 11a and 11b have been formed during molding. The bottoms 13a and 13b of the recesses 4a and 4b are inclined in such a manner that the axial depths of the recesses 4a and 4b increase as the distance from the central axis $S_1$ of the hole 2 increases.

As a result of the shrinkage of the plastic during the cooling process upon injection, the projections 11a and 11b of the retaining elements 7a and 7b, respectively, exert pressure in a direction transverse to the central axis Si on the inner walls 14a and 14b of the recesses 4a and 4b, respectively, which walls are disposed parallel to the central axis $S_1$, and on the inclined bottoms 13a and 13b of these recesses. In addition to the forces transverse to the central axis $S_1$, the projections 11a and 11b also exert axial forces in the direction of the axis $S_1$ on the inclined bottoms 13a and 13b. The axial force component prevents the retaining elements 7a and 7b of the mounting part 15 from being lifted off the metal supporting plate 1, and the radial force component aligns the mounting part 15 with respect to the axis of the hole 2.

Figure 3:
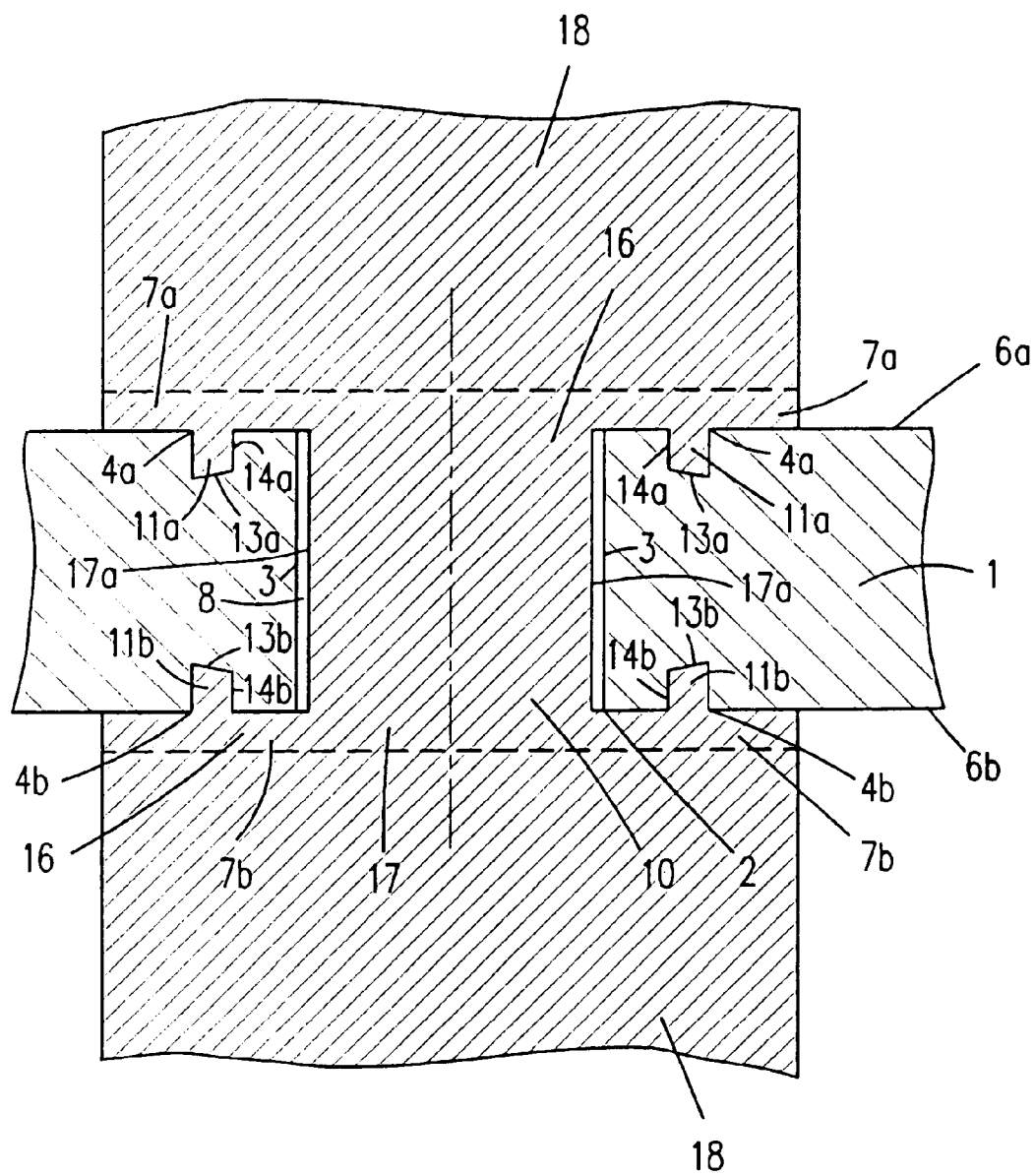
FIG. 3 is a sectional view of a metal supporting plate with a hole of circular cross-section, with two annular recesses associated with the hole and formed in the surface of the metal supporting plate, and with a molded-on plastic mounting part whose bridge element is solid.

FIG. 3 shows a mounting part 16 which, in contradistinction to the mounting part 15 shown in FIGS. 1 and 2, comprises a solid bridge element 17 having bridge element walls 17a. The mounting part 16 is integral with a function part 18, which is shown diagrammatically. This function part 18 can be, for example, a spindle, a lever or the like.

Figure 4:
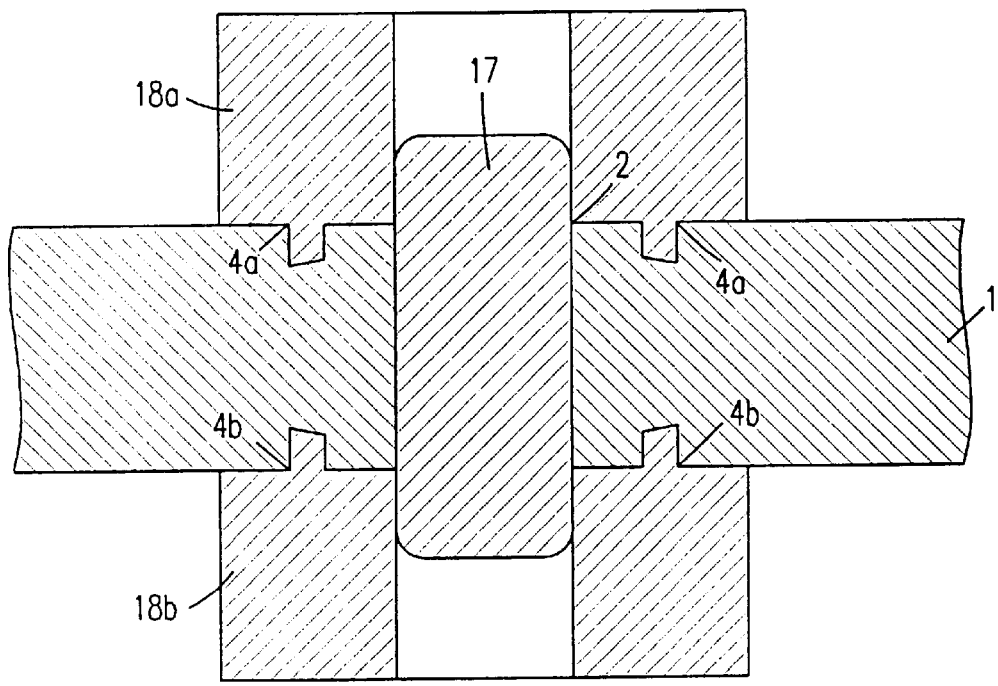
FIG. 4 is a sectional view of the metal supporting plate shown in FIG. 1, the hole being filled by means of a filling die during the formation of the recesses, and recesses associated with the hole being formed by means of punching dies.

FIG. 4 shows a possible method of forming the annular recesses 4a and 4b. It is not unlikely that the hole 2 is deformed during the formation of the recesses. In order to preclude deformation of the hole 2 during punching of the recesses 4a and 4b, the hole 2 is therefore filled up by means of a filling die 17 during the formation of the recesses 4a and 4b. While the filling die 17 is present two punching dies 18a and 18b are applied to the metal supporting plate 1 and the recesses 4a and 4b are punched. The filling die 17 then ensures that the shape of the hole 2 remains unchanged.

Figure 5:
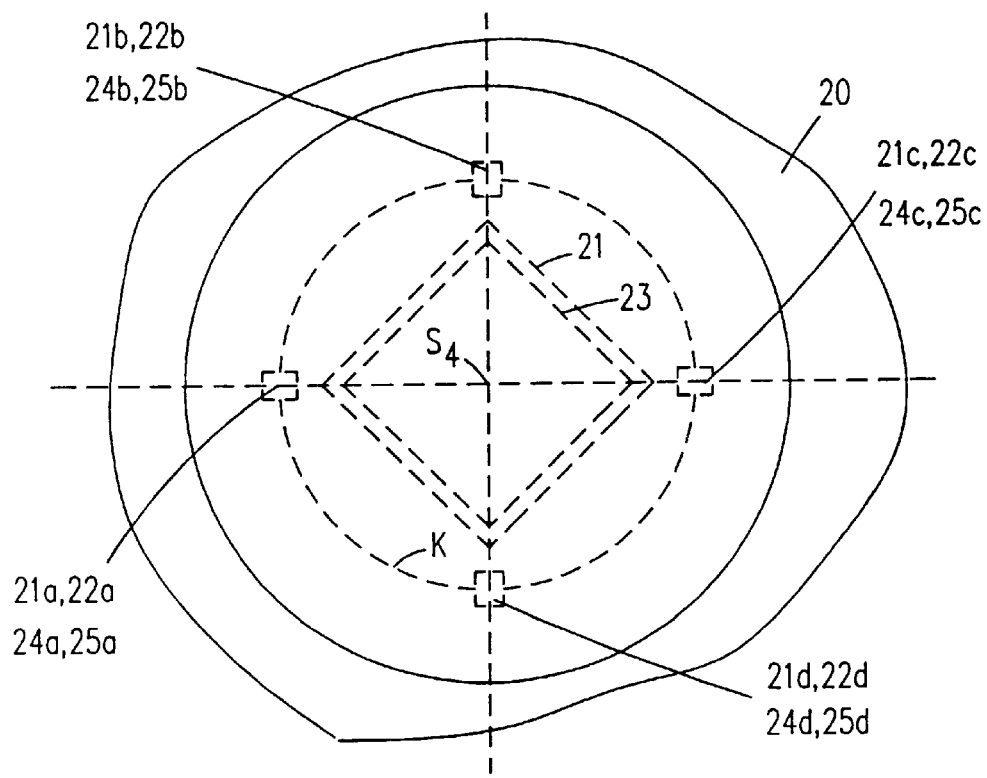
FIG. 5 is a plan view similar to FIG. 1, in which the hole is square and has four associated separate recesses in the plate surface on each side.

FIG. 5 is a plan view showing a part of a metal supporting plate 20 having a square hole 21. In a plate surface on one side of the metal supporting plate 20 four separate recesses 21a to 21d have been formed adjacent the hole 21 and in a plate surface on the other side four separate recesses 22a to 22d have been formed. The recesses 21a to 21d and 22a to 22d each have the same distance from the central axis $S_4$ of the hole 21 and are thus situated on a circle K around the central axis $S_4$ of the hole 21. The recesses 21a to 21d as well as 22a to 22d are spaced at 90° one from the other.

In the same way as in the preceding embodiments a mounting part 23 has been formed in the hole 21, whose projections 24a to 24d engage in the recesses 21a to 21d and whose projections 25a to 25d engage in the recesses 22a to 22d.

The equispaced arrangement of the recesses 21a to 21d and 22a to 22d ensures that the forces exerted on the recesses 21a to 21d and 22a to 22d by the projections 24a to 24d and 25a to 25d, respectively, are uniformly distributed. Thus, the mounting part 23 is stabilized and centered with respect to the central axis $S_4$ of the hole 21 by utilizing the forces produced during shrinkage.

I claim:

1. A molded plastic mounting part formed as a base for function parts on a metal supporting plate having a hole about an axis, which mounting part, in order to be mounted on said supporting plate, comprises:

a bridge element traversing the hole in the metal supporting plate, and retaining elements which bear against both plate surfaces of the metal supporting plate, characterized in that the plate surfaces of the metal supporting plate have recesses adjacent the hole, wherein the recesses are engaged by projections of the retaining elements of the mounting part and the bottoms of the recesses are inclined with respect to the plate center in such a manner that throughout the recesses the depth of the recesses increases as the distance from the axis of the hole increases.

2. A mounting part as claimed in claim 1, characterized in that both plate surfaces of the metal supporting plate have at least three recesses adjacent the hole, which recesses are disposed on the circumference of a circle around the hole, spaced at angles of 360°/x from one another, x being the number of recesses in each plate surface, and the mounting part is centered with respect to the axis by the arrangement of the recesses.

3. A mounting part as claimed in claim 1, characterized in that the two plate surfaces of the metal supporting plate have annular recesses having central axes, the central axes of the annular recesses being essentially identical to the axis of the hole, and the mounting part is centered with respect to the axis by the arrangement of the recesses.

4. A mounting part as claimed in claim 1 wherein the recesses have walls that extend in a direction parallel to the axis of the hole so that, during cooling and shrinkage of the molded plastic mounting part the walls of the recesses prevent radial movement of the mounting part thereby to ensure that the mounting part is centered with respect to the axis of the hole.

* * * * *